US010717476B2

United States Patent
(12) United States Patent
Lee et al.

(10) Patent No.: US 10,717,476 B2
(45) Date of Patent: Jul. 21, 2020

(54) CAB MOUNTING APPARATUS FOR COMMERCIAL VEHICLE

(71) Applicants: Hyundai Motor Company, Seoul (KR); Kia Motors Corporation, Seoul (KR)

(72) Inventors: Kyong Sup Lee, Suwon-si (KR); Dae Su Kim, Jeonju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 32 days.

(21) Appl. No.: 16/196,477

(22) Filed: Nov. 20, 2018

(65) Prior Publication Data

US 2019/0152539 A1 May 23, 2019

(30) Foreign Application Priority Data

Nov. 21, 2017 (KR) ........................ 10-2017-0155301

(51) Int. Cl.
*B62D 33/06* (2006.01)
*B62D 33/067* (2006.01)

(52) U.S. Cl.
CPC ....... *B62D 33/067* (2013.01); *B62D 33/0604* (2013.01)

(58) Field of Classification Search
CPC . B62D 33/063; B62D 33/067; B62D 33/0604
USPC .......... 296/190.05, 190.07; 180/89.12–89.14
See application file for complete search history.

(56) References Cited

U.S. PATENT DOCUMENTS 3,985,385 A * 10/1976 Kennicutt ............ B60G 99/004 296/35.1
2001/0006299 A1* 7/2001 Yoo .................... B62D 33/0604 296/190.07
2002/0028031 A1* 3/2002 Testroet ............... B62D 33/067 384/215
2006/0131801 A1* 6/2006 Barickman ........ B62D 33/0604 267/293
2006/0266573 A1* 11/2006 Ishii ................... B62D 33/0604 180/326
2010/0236857 A1* 9/2010 Albright ............ B62D 33/0604 180/328
2011/0254242 A1* 10/2011 Eismann .............. B60G 21/052 280/124.106
2011/0266727 A1* 11/2011 Knevels .................... F16F 9/54 267/64.24

(Continued)

FOREIGN PATENT DOCUMENTS

DE 102010055947 A1 * 8/2011

*Primary Examiner* — Gregory A Blankenship
(74) *Attorney, Agent, or Firm* — Slater Matsil, LLP

(57) ABSTRACT

A cab mounting apparatus for a vehicle includes a front mount connecting between a front side of a cab and a chassis. A rear mount connects between a rear side of the cab and the chassis. The front mount includes a stabilizer link disposed on a front side of the vehicle, a pair of front brackets individually fixed to the front side of the cab, and a pair of connecting arms individually connecting between respective ends of the stabilizer link and the respective front brackets. Each connecting arm is pivotally connected to each front bracket by a hinge member and a bush. The bush has a pair of stopper members disposed on both ends thereof. The bush and the pair of stopper members are integrated into a single unitary body.

20 Claims, 21 Drawing Sheets

28 5 22 23 21 28 21a 20 6 3 22 23 21a A 6 Rear Front

(56) References Cited

U.S. PATENT DOCUMENTS

| | | | | |
|---|---|---|---|---|
| 2015/0336623 | A1* | 11/2015 | Dupon | B62D 65/02 296/190.07 |
| 2018/0094404 | A1* | 4/2018 | Paolini | B62D 33/0617 |
| 2018/0179028 | A1* | 6/2018 | Henkel | B66C 13/54 |
| 2018/0201331 | A1* | 7/2018 | Helm | B62D 33/0617 |
| 2019/0002033 | A1* | 1/2019 | Vreede | B62D 33/067 |
| 2019/0100255 | A1* | 4/2019 | Benevelli | B60G 99/002 |
| 2019/0152539 | A1* | 5/2019 | Lee | B62D 33/0604 |
| 2019/0300058 | A1* | 10/2019 | Lam | C22C 38/54 |

* cited by examiner

CAB MOUNTING APPARATUS FOR COMMERCIAL VEHICLE

CROSS-REFERENCE TO RELATED APPLICATIONS

This application claims priority to Korean Patent Application No. 10-2017-0155301, filed in the Korean Intellectual Property Office on Nov. 21, 2017, which application is hereby incorporated herein by reference.

TECHNICAL FIELD

The present disclosure relates to a cab mounting apparatus for a commercial vehicle.

BACKGROUND

In general, an engine compartment is mounted in front of a commercial vehicle such as a truck, and a cab in which a driver is seated is mounted over the engine compartment. In order to check various devices/components (engine, other devices, and the like) mounted in the engine compartment, it is required to inspect various devices/components after tilting the cab using a tilting cylinder. When the inspection is completed, the cab is returned to its original portion, and then the cab is locked to a chassis using a locking device for safety.

The cab for a commercial vehicle may be mounted to be supported and tilted on the chassis by a cab mounting apparatus.

The cab mounting apparatus for a commercial vehicle may be configured to connect the cab to the chassis, and to absorb vibrations transmitted from the chassis to the cab while the vehicle is driving, thereby improving ride comfort.

The cab mounting apparatus for a commercial vehicle includes a front mount that connects between the front of the cab and the chassis, and a rear mount that connects between the rear of the cab and the chassis.

The front mount includes a stabilizer disposed on the front side of the vehicle, a pair of front brackets fixed to the bottom of the front side of the cab, and a pair of connecting arms connected between the stabilizer and the respective front brackets.

Each connecting arm may be pivotally connected to the front bracket through a hinge bolt and a bush disposed around the hinge bolt. The bush may be made of a mixture of natural rubber, aluminum, steel, and the like. The bush may absorb relative displacement between the front bracket and the connecting arm, thereby preventing longitudinal movement of the cab, and absorbing vibrations transmitted from the chassis.

A pair of stoppers may be symmetrically attached to both left and right surfaces of the bush, and each stopper may be made of a shock-absorbing material such as polyurethane. Thus, the pair of stoppers may reinforce longitudinal stiffness of the bush, and prevent contact or interference between the connecting arm and the front bracket.

Rubber grease such as NIGLUBE® from NIPPON GREASE CO., Ltd. may be applied between the stopper and the front bracket, thereby preventing frictional contact and noise between the stopper and the front bracket.

As such, the structure of the conventional front mount allowing the pivotal connection of the connecting arm and the front bracket further includes the pair of stoppers and the rubber grease in addition to the hinge pin and the bush, and thus the assembly thereof may be troublesome and the manufacturing costs may be increased.

In the conventional front mount, the bush may fail to sufficiently absorb the relative displacement between the front bracket and the connecting arm, and thus it has disadvantages of failing to prevent the longitudinal movement and vibration of the cab properly, and of low durability.

The rear mount includes a rear bridge disposed across two side members, a pair of dampers disposed between respective ends of the rear bridge and the bottom of the rear side of the cab, and a pair of shock absorbers connected between the respective dampers and the rear bridge.

The pair of shock absorbers may be disposed on both left and right sides of the cab in a lateral direction of the cab, and thus be configured to prevent lateral movement and lateral vibration at the rear side of the cab.

However, the conventional rear mount uses a relatively expensive shock absorber, and thus has a disadvantage of high manufacturing cost. In addition, the conventional rear mount is not sufficient to prevent the lateral movement and lateral vibration effectively.

SUMMARY

Embodiments can solve the above-mentioned problems occurring in the related art while advantages achieved by the related art are maintained intact.

An aspect of the present disclosure provides a cab mounting apparatus for a commercial vehicle, capable of mounting a cab for a commercial vehicle on a chassis stably, thereby improving vibration performance, ride comfort, and the like.

According to an aspect of the present disclosure, a cab mounting apparatus for a commercial vehicle may include a front mount connecting between a front side of a cab and a chassis. A rear mount connects between a rear side of the cab and the chassis. The front mount includes a stabilizer link disposed on a front side of the vehicle, a pair of front brackets individually fixed to the front side of the cab, and a pair of connecting arms individually connecting between respective ends of the stabilizer link and the respective front brackets. Each connecting arm is pivotally connected to each front bracket by a hinge member and a bush. The bush has a pair of stopper members disposed on both ends thereof. The bush and the pair of stopper members are integrated into a single unitary body.

The pair of stopper members may be molded with the bush by insert molding such that the pair of stopper members may be integrated into both ends of the bush to form the single unitary body.

Each connecting arm may have a first hinge hub pivotally connected to each front bracket, and a second hinge hub pivotally connected to each end of the stabilizer link. The first hinge hub may have a first through bore in which the hinge member and the bush disposed around the hinge member are received, and the second hinge hub may have a second through bore in which each end of the stabilizer link is received.

A flange having an annular shape may be provided on one end of the bush, and an outer diameter of the flange may be greater than an outer diameter of the bush.

The bush may be press-fit into the first through bore.

The bush may include a pair of opposing voids, and the pair of voids may be spaced apart from each other in a direction in which a load is applied to the bush.

The bush may be made of a rubber material, and the stopper member may be made of a metal material.

The rear mount may include a rear bridge connecting between a pair of side members, a pair of rear dampers individually disposed between respective ends of the rear bridge and a bottom of the rear side of the cab, and a pair of lateral damping rods individually mounted between respective ends of the rear bridge and the respective rear dampers.

Each lateral damping rod may be extended in a lateral direction of the cab.

The lateral damping rod may have a shape of a bar having a thickness less than a width thereof.

An upper bracket may be coupled to a top end of each rear damper, the rear bridge may have a pair of fixing brackets symmetrically disposed, and the pair of lateral damping rods may be individually connected between the upper brackets of the rear dampers and the fixing brackets of the rear bridge, respectively.

Each lateral damping rod may have a first hinge hub pivotally connected to each upper bracket by a first hinge member and a first bush, and a second hinge hub pivotally connected to each fixing bracket of the rear bridge by a second hinge member and a second bush.

The first hinge hub may have a first through bore in which the first hinge member and the first bush disposed around the first hinge member are received.

The first bush may have a bore through which the first hinge member passes, and an inner diameter of the bore may be greater than an outer diameter of the first hinge member.

The second hinge hub may have a second through bore in which the second hinge member and the second bush disposed around the second hinge member are received.

The second bush may have a bore through which the second hinge member passes, and an inner diameter of the bore may be greater than an outer diameter of the second hinge member.

At least one of the first bush and the second bush may include a pair of opposing voids provided therein.

The pair of voids may be spaced apart from each other in a direction in which a load is applied to the at least one of the first bush and the second bush.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
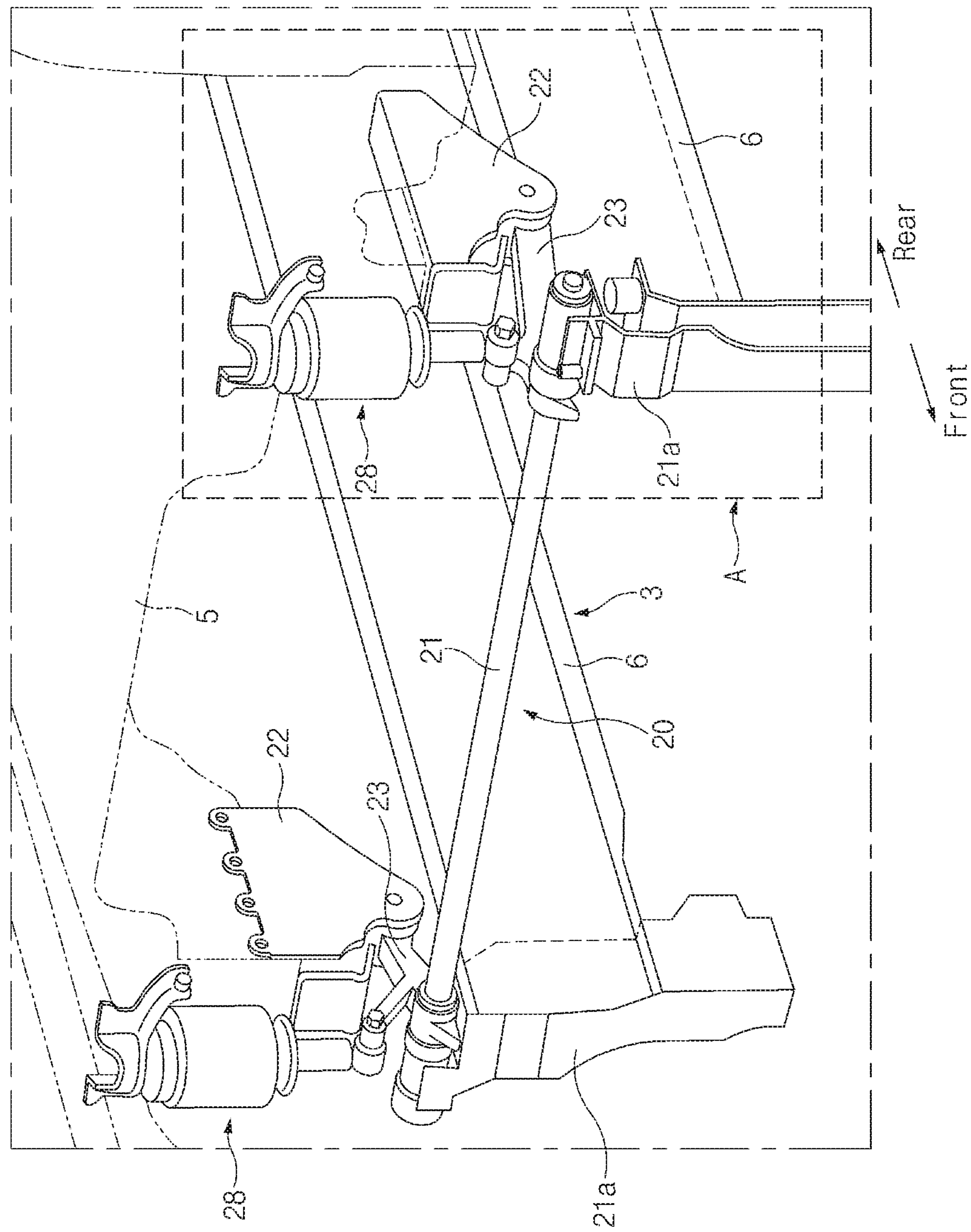
FIG. 1 illustrates a front perspective view of a front mount in a cab mounting apparatus for a commercial vehicle, according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
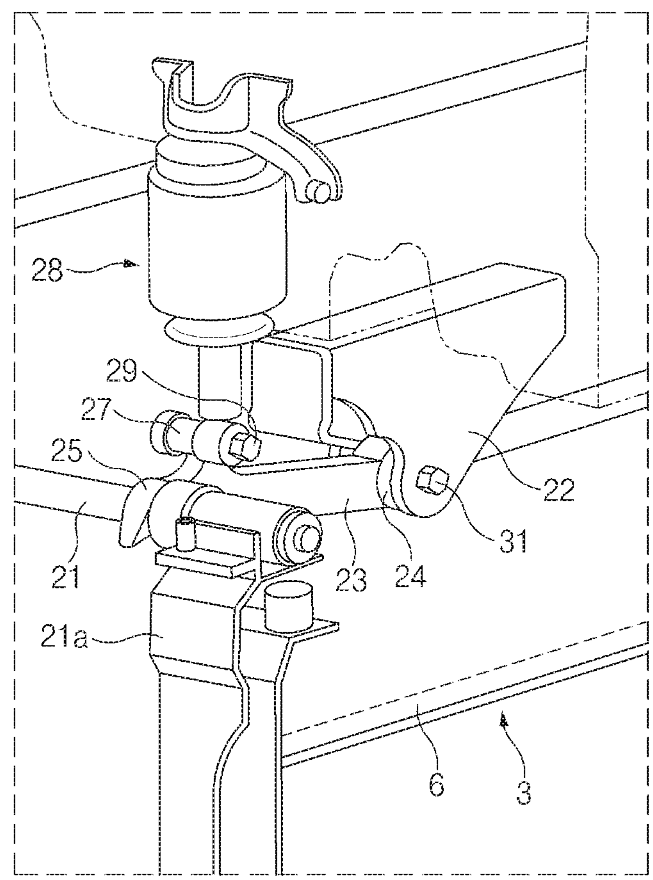
FIG. 2 illustrates an enlarged view of portion A in FIG. 1.
Figure 3:
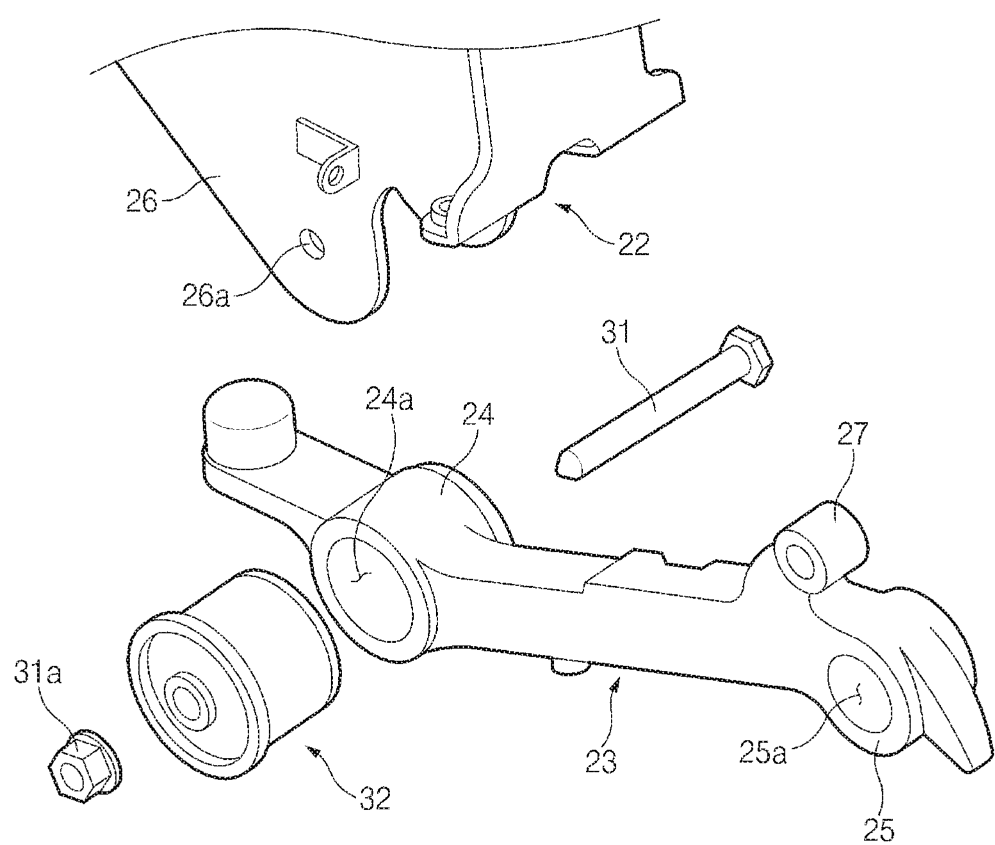
FIG. 3 illustrates a relationship of a connecting arm, a bush, and a front bracket of a front mount in a cab mounting apparatus for a commercial vehicle, according to an exemplary embodiment of the present disclosure.
Figure 4:
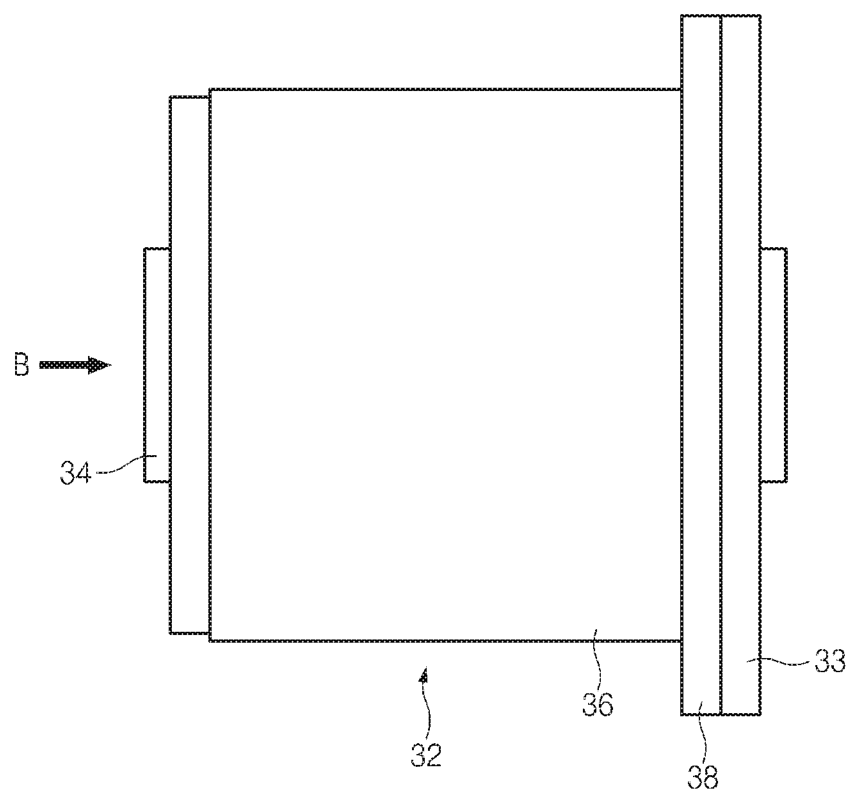
FIG. 4 illustrates a side view of a bush of a front mount in a cab mounting apparatus for a commercial vehicle, according to an exemplary embodiment of the present disclosure.
Figure 5:
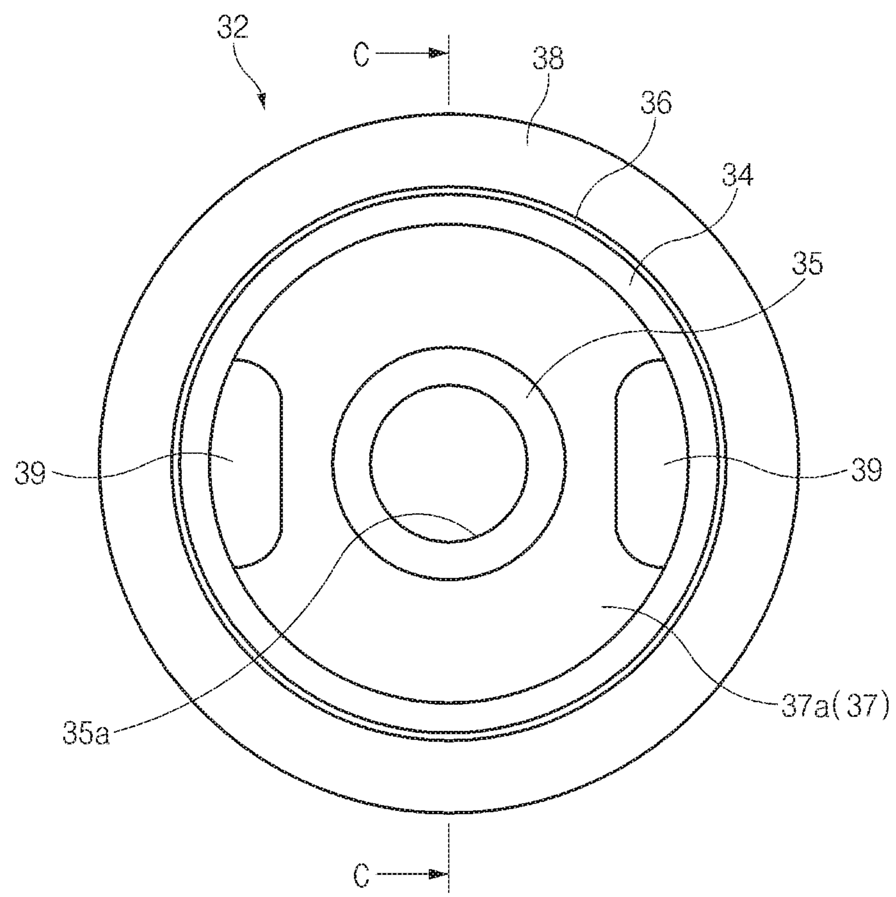
FIG. 5 illustrates a view of the bush in a viewing direction indicated by arrow B in FIG. 4.
Figure 6:
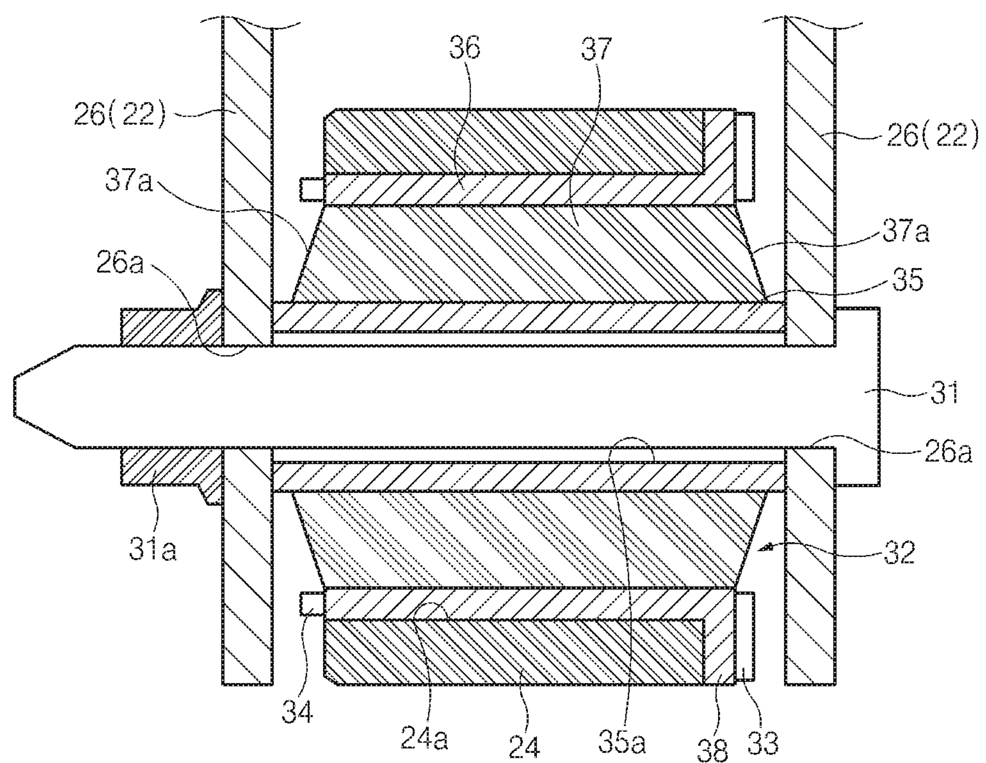
FIG. 6 illustrates a cross-sectional view of a structure in which the bush is mounted in a first hinge hub of a connecting arm, taken along line C-C in FIG. 5.
Figure 7:
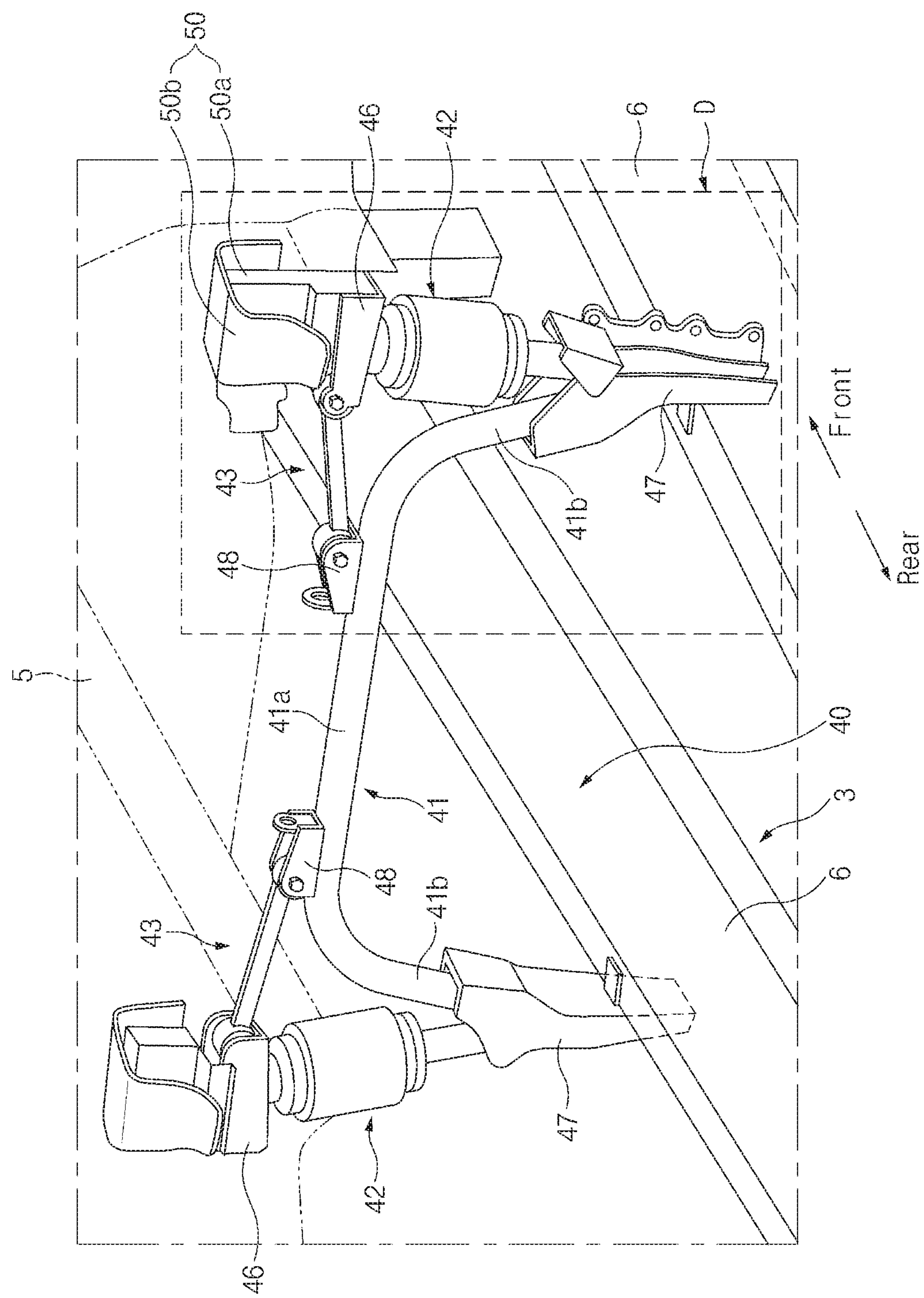
FIG. 7 illustrates a rear perspective view of a rear mount in a cab mounting apparatus for a commercial vehicle, according to an exemplary embodiment of the present disclosure.
Figure 8:
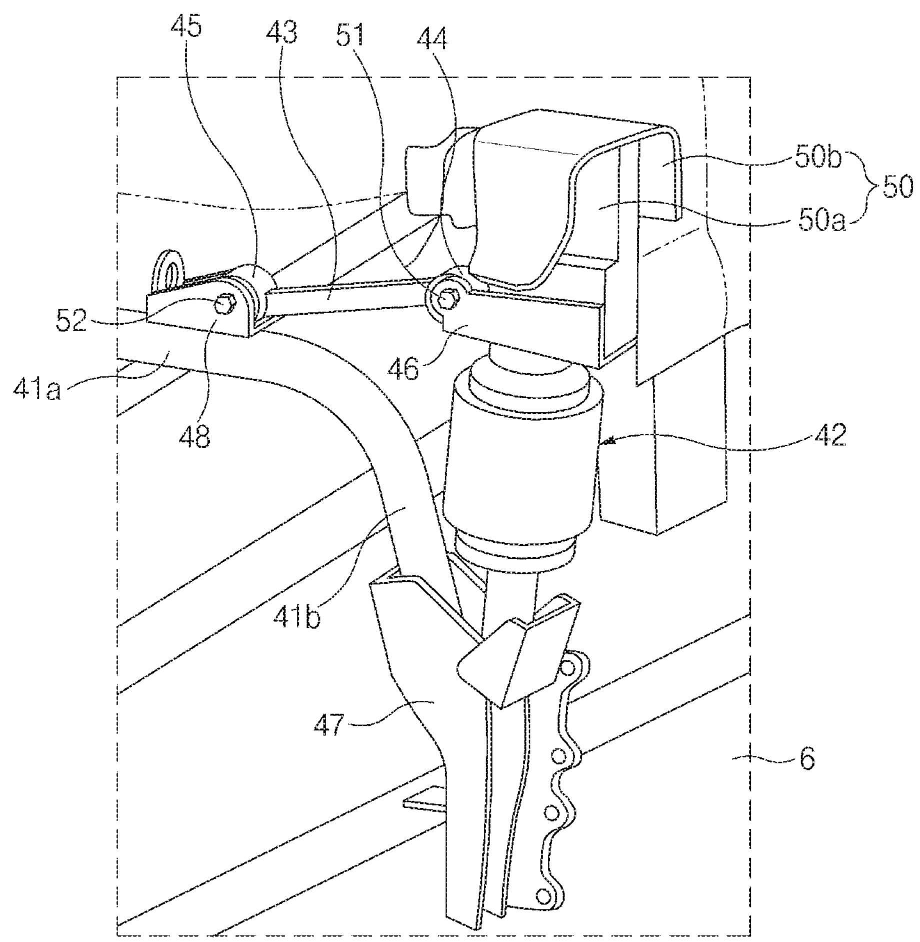
FIG. 8 illustrates an enlarged view of portion D in FIG. 7.
Figure 9:
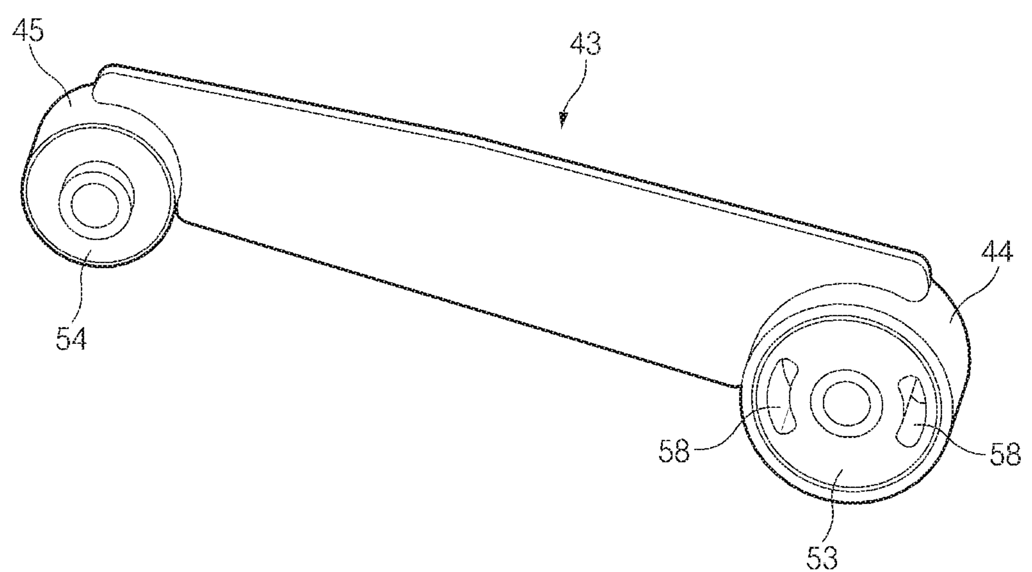
FIG. 9 illustrates a perspective view of a lateral damping rod of a rear mount in a cab mounting apparatus for a commercial vehicle, according to an exemplary embodiment of the present disclosure.
Figure 10:
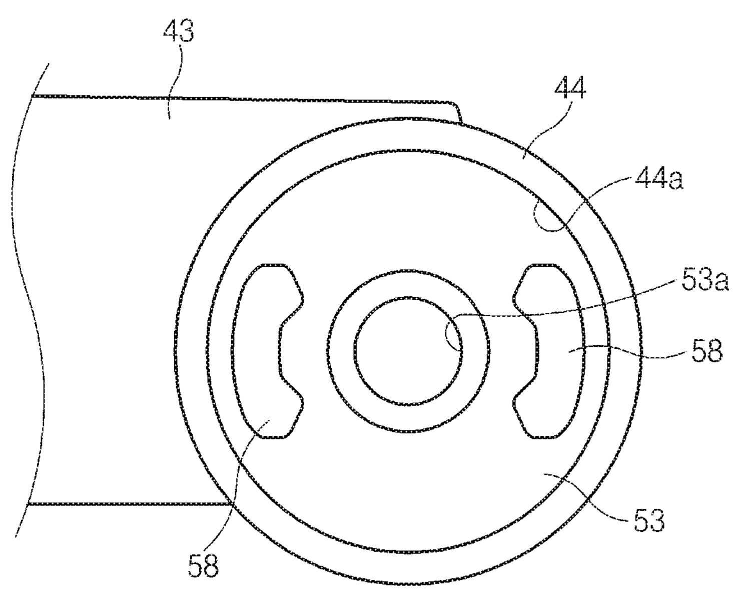
FIG. 10 illustrates a front view of a first hinge hub of the lateral damping rod in FIG. 9.

Referring to FIGS. 1 and 2, a cab mounting apparatus 10 for a commercial vehicle, according to an exemplary embodiment of the present disclosure, may include a front mount 20 connecting between the front of a cab 5 and a chassis 3, and a rear mount 40 connecting between the rear of the cab 5 and the chassis 3.

A commercial vehicle such as a truck may include a chassis 3, and the chassis 3 may include an engine, a power train, a steering system, a brake system, a suspension system, and a frame. The frame of the chassis 3 may include a pair of side members 6 extending in a longitudinal direction of the vehicle, and the pair of side members 6 may be spaced apart from each other in a lateral direction of the vehicle.

The cab 5 may be mounted on the pair of side members 6 through the front mount 20 and the rear mount 40.

The front mount 20 may include a stabilizer link 21 disposed on the front side of the vehicle, a pair of front brackets 22 individually fixed to the front side of the cab 5, and a pair of connecting arms 23 individually connecting between respective ends of the stabilizer link 21 and the respective front brackets 22.

The stabilizer link 21 may be disposed on the front side of the vehicle, and may be a part of automobile suspension that helps reduce the body roll of the vehicle during fast cornering or over road irregularities.

The stabilizer link 21 may be extended between the pair of side members 6. Both ends of the stabilizer link 21 may be connected to the pair of side members 6 through a pair of stabilizer brackets 21*a*. The ends of the stabilizer link 21 may be rotatably mounted on the stabilizer brackets 21*a*, respectively, and the stabilizer brackets 21*a* may be attached to the side members 6, respectively.

The pair of front brackets 22 may be individually fixed to the bottom of the front side of the cab 5, and the pair of front brackets 22 may be spaced apart from each other in a lateral direction of the cab 5.

The front bracket 22 may have two mounting plates 26 spaced apart from each other, and each mounting plate 26 may have a hole 26*a* through which a hinge member 31 passes. Each connecting arm 23 may be pivotally connected to the two mounting plates 26 through the hinge member 31 and a bush 32.

The pair of connecting arms 23 may connect between the ends of the stabilizer link 21 and the front brackets 22, respectively, such that they may be symmetrically disposed on the front side of the cab 5. Each connecting arm 23 may be extended in a longitudinal direction of the cab 5.

Each connecting arm 23 may have a first hinge hub 24 pivotally connected to each front bracket 22, and a second hinge hub 25 pivotally connected to each end of the stabilizer link 21. The first hinge hub 24 and the second hinge hub 25 may be spaced apart from each other in a longitudinal direction of the connecting arm 23.

The first hinge hub 24 may be a hollow cylinder having a first through bore 24*a* in which the hinge member 31 and the bush 32 disposed around the hinge member 31 are received. The first hinge hub 24 may be interposed between the two mounting plates 26 of the front bracket 22, and the hinge member 31 may pass through the holes 26*a* of the two mounting plates 26 and the first through bore 24*a* of the first hinge hub 24 such that the first hinge hub 24 may be pivotally connected to the two mounting plates 26 of the front bracket 22.

The hinge member 31 may be a head bolt having a head. A nut 31*a* may be engaged with the hinge member 31 passing through the two mounting plates 26 such that the hinge member 31 may be fixed between the two mounting plates 26.

The bush 32 may have a shape corresponding to that of the first through bore 24*a* of the first hinge hub 24 such that the bush 32 may be received in the first through bore 24*a*.

A flange 38 having an annular shape may be provided on one end of the bush 32, and the flange 38 may be extended outwardly from one end of the bush 32 such that an outer diameter of the flange 38 may be greater than an outer diameter of the bush 32.

When the bush 32 is inserted into the first through bore 24*a* of the first hinge hub 24, the flange 38 may contact one surface of the first hinge hub 24. The flange 38 may allow the bush 32 to be accurately positioned in the first through bore 24*a* of the first hinge hub 24 such that assembly of the bush 32 may be easy and accurate.

For example, the outer diameter of the bush 32 may be slightly greater than an inner diameter of the first through bore 24*a* of the first hinge hub 24 such that the bush 32 may be press-fit into the first through bore 24*a*.

The bush 32 may include an inner cylinder portion 35, an outer cylinder portion 36 disposed outwardly of the inner cylinder portion 35, and an elastic portion 37 disposed between the inner cylinder portion 35 and the outer cylinder portion 36.

The inner cylinder portion 35 may have a bore 35*a* through which the hinge member 31 passes, and an inner diameter of the bore 35*a* may be greater than an outer diameter of the hinge member 31.

The flange 38 may be provided on one end of the outer cylinder portion 36, and the flange 38 may be extended outwardly from one end of the outer cylinder portion 36.

The elastic portion 37 may have an outer tapered surface 37*a*, and the tapered surface 37*a* may improve the shock-absorbing performance of the bush 32.

The bush 32 may include a pair of opposing voids 39 inside the elastic portion 37. The pair of voids 39 may be spaced apart from each other in a direction in which a load is applied to the bush 32. For example, since the connecting arm 23 is extended in the longitudinal direction of the cab 5, the load may be applied to the connecting arm 23 in the longitudinal direction of the cab 5 such that the pair of voids 39 may be spaced apart from each other in the longitudinal direction of the connecting arm 23.

Each void 39 may have a circular arc shape corresponding to the circular cross-section of the bush 32. As the pair of voids 39 are spaced apart from each other in the elastic portion 37 in the longitudinal direction of the cab 5, they may lessen or absorb shock to the connecting arm 23 in the longitudinal direction of the cab 5, and thus the longitudinal movement, longitudinal vibration, and the like of the cab 5 may be effectively prevented.

According to an exemplary embodiment, the bush 32 may be made of a rubber material. For example, molten natural rubber may be molded to form the bush 32 of natural rubber.

According to another exemplary embodiment, the bush 32 may be made of a rubber mixture in which fine reinforcing particles such as metallic particles are uniformly dispersed in molten natural rubber. For example, the rubber mixture in which fine reinforcing particles such as metallic particles are uniformly dispersed in molten natural rubber may be molded to form the bush 32 of the rubber mixture in which the reinforcing particles are dispersed. Thus, the bush 32 may be improved by not only the shock-absorbing properties of the rubber material but also the rigidity of the reinforcing particles.

A pair of stopper members 33 and 34 may be disposed on both ends of the bush 32 to reinforce the rigidity of the bush 32, and each of the stopper members 33 and 34 may have an annular shape. The stopper members 33 and 34 may be interposed between the bush 32 and the front brackets 22, respectively, thereby preventing direct contact between the bush 32 and the front brackets 22 to prevent the bush 32 from being worn or damaged.

The pair of stopper members 33 and 34 may include a first stopper member 33 coupled to one end of the bush 32, that is, the flange 38 of the bush 32, and a second stopper member 34 coupled to the other end of the bush 32. The first stopper member 33 may have an annular shape corresponding to that of the flange 38, and an outer diameter of the first stopper member 33 may be greater than an outer diameter of the second stopper member 34.

According to an exemplary embodiment, the stopper members 33 and 34 may be made of a metal material such as aluminum.

The pair of stopper members 33 and 34 and the bush 32 may be integrated into a single unitary body. In particular, the pair of stopper members 33 and 34 may be molded together with the bush 32 by insert molding such that the integrated structure of the bush 32 and the pair of stopper members 33 and 34 may further be reinforced.

As the bush 32 and the pair of stopper members 33 and 34 are integrated as the single unitary body, the longitudinal movement and longitudinal vibration of the cab 5 may effectively be prevented, and the assembly of the bush 32 and the stopper members 33 and 34 may be facilitated. As the longitudinal stiffness of the bush 32 is reinforced using the pair of stopper members 33 and 34, durability of the bush 32 may be improved. By the insert molding of the bush 32 and the pair of stopper members 33 and 34 without separately manufacturing them, the manufacturing costs may be significantly reduced.

The second hinge hub 25 may be a hollow cylinder having a second through bore 25*a* in which each end of the stabilizer link 21 is received. As each end of the stabilizer link 21 is received in the second through bore 25*a* of the second hinge hub 25, each end of the stabilizer link 21 may be pivotally connected to the connecting arm 23.

A pair of front dampers 28 may be mounted on a front wall of the cab 5, and be connected to the connecting arms 23, respectively. Each connecting arm 23 may have a third hinge hub 27 protruding upwardly from a portion of the connecting arm adjacent to the second hinge hub 25. The third hinge hub 27 may be pivotally connected to the bottom end of the front damper 28 through a hinge pin 29. For example, the front damper 28 may have a structure in which a rubber spring, a shock absorber (or a gas spring), and the like are combined.

The rear mount 40 may include a rear bridge 41 connecting between the pair of side members 6, a pair of rear dampers 42 individually disposed between respective ends of the rear bridge 41 and the bottom of the rear side of the cab 5, and a pair of lateral damping rods 43 individually provided between respective ends of the rear bridge 41 and the respective rear dampers 42.

The rear bridge 41 may connect between the pair of side members 6. The rear bridge 41 may have a traverse portion 41*a* disposed on a central portion thereof, and a pair of bent legs 41*b* disposed on both ends thereof.

The traverse portion 41*a* may be formed straightly to traverse between the pair of side members 6, and the bent legs 41*b* may be extended from respective ends of the traverse portion 41*a* to be substantially perpendicular thereto. The bent legs 41*b* of the rear bridge 41 may be connected to the side members 6, respectively.

The pair of rear dampers 42 may be individually mounted between the bottom of the rear side of the cab 5 and the respective legs 41*b* of the rear bridge 41 such that they may be symmetrically disposed on the rear side of the cab 5. For example, the rear damper 42 may have a structure in which a rubber spring, a shock absorber (or a gas spring), and the like are combined.

An upper bracket 46 may be coupled to the top end of each rear damper 42, and a lower bracket 47 may be pivotally connected to the bottom end of each rear damper 42.

A locking device 50 may be disposed on top of the upper bracket 46, and the upper bracket 46 may be locked or unlocked to a rear wall of the cab 5 by the locking device 50.

The locking device 50 may include a latch 50*a* and a striker 50*b*. The latch 50*a* may be fixed to the upper bracket 46, and the striker 50*b* may be fixed to the rear wall of the cab 5. As the latch 50*a* is engaged with or disengaged from the striker 50*b*, the cab 5 may be locked or unlocked to the side members 6 of the chassis 3. For example, when the latch 50*a* is disengaged from the striker 50*b*, the cab 5 may be unlocked to the side members 6 of the chassis 3, and in a state in which the cab 5 is unlocked to the side members 6 of the chassis 3, the cab 5 may be tilted by a tilting cylinder (not shown). After the cab 5 is returned to its original position, when the latch 50*a* is engaged with the striker 50*b*, the cab 5 may be locked to the side members 6 of the chassis 3.

The lower bracket 47 may be fixed to each side member 6 using a fastener, welding, or the like, and each bent leg 41*b* of the rear bridge 41 may be coupled to the lower bracket 47 such that both ends of the rear bridge 41 may be connected to the pair of side members 6 through the pair of lower brackets 47.

The pair of lateral damping rods 43 may individually connect between the upper brackets 46 of the rear dampers 42 and the ends of the traverse portion 41*a* of the rear bridge 41, respectively, such that they may be symmetrically disposed on the traverse portion 41*a* of the rear bridge 41. Each lateral damping rod 43 may be extended in the lateral direction of the cab 5. In particular, each lateral damping rod 43 may have a shape of a bar having a thickness less than a width thereof, thereby significantly reducing the manufacturing costs and weight.

Each lateral damping rod 43 may have a first hinge hub 44 pivotally connected to the upper bracket 46, and a second hinge hub 45 pivotally connected to the traverse portion 41*a* of the rear bridge 41. The first hinge hub 44 and the second hinge hub 45 may be spaced apart from each other in a longitudinal direction of the lateral damping rod 43.

The first hinge hub 44 may be a hollow cylinder having a first through bore 44*a* in which a first hinge member 51 and a first bush 53 disposed around the first hinge member 51 are received. The first hinge hub 44 may be pivotally connected to the upper bracket 46 by the first hinge member 51 and the first bush 53.

The first bush 53 may have a bore 53*a* through which the first hinge member 51 passes, and an inner diameter of the bore 53*a* may be greater than an outer diameter of the first hinge member 51.

The first bush 53 may include a pair of opposing voids 58 formed therein. The pair of voids 58 may be spaced apart from each other in a direction in which a load is applied to the first bush 53. For example, since the lateral damping rod 43 is extended in the lateral direction of the cab 5, the load may be applied to the lateral damping rod 43 in the lateral direction of the cab 5 such that the pair of voids 58 may be spaced apart from each other in the lateral direction of the cab 5.

Each void 58 may have a circular arc shape corresponding to the circular cross-section of the first bush 53. As the pair of voids 58 are spaced apart from each other in the first bush 53 in the lateral direction of the cab 5, they may lessen or absorb shock to the lateral damping rod 43 in the lateral direction of the cab 5, and thus the lateral movement, lateral vibration, and the like of the cab 5 may be effectively prevented.

According to an exemplary embodiment, the first bush 53 may be made of a rubber material. For example, molten natural rubber may be molded to form the first bush 53.

According to another exemplary embodiment, the first bush 53 may be made of a rubber mixture in which fine reinforcing particles such as metallic particles are uniformly dispersed in molten natural rubber. For example, the rubber mixture in which fine reinforcing particles such as metallic particles are uniformly dispersed in molten natural rubber may be molded to form the first bush 53.

The second hinge hub 45 may have a second through bore 45*a* in which a second hinge member 52 and a second bush 54 disposed around the second hinge member 52 are received.

A pair of fixing brackets 48 may be symmetrically disposed on the traverse portion 41*a* of the rear bridge 41. Each fixing bracket 48 may be fixed to the traverse portion 41*a* of the rear bridge 41 using a fastener, welding, or the like. The second hinge hub 45 may be pivotally connected to the fixing bracket 48 by the second hinge member 52 and the second bush 54.

The second bush 54 may have a bore 54*a* through which the second hinge member 52 passes, and an inner diameter of the bore 54*a* may be greater than an outer diameter of the second hinge member 52.

According to an exemplary embodiment, the second bush 54 may be made of a rubber material. For example, molten natural rubber may be molded to form the second bush 54.

According to another exemplary embodiment, the second bush 54 may be made of a rubber mixture in which fine reinforcing particles such as metallic particles are uniformly dispersed in molten natural rubber. For example, the rubber mixture in which fine reinforcing particles such as metallic particles are uniformly dispersed in molten natural rubber may be molded to form the second bush 54.

Figure 11:
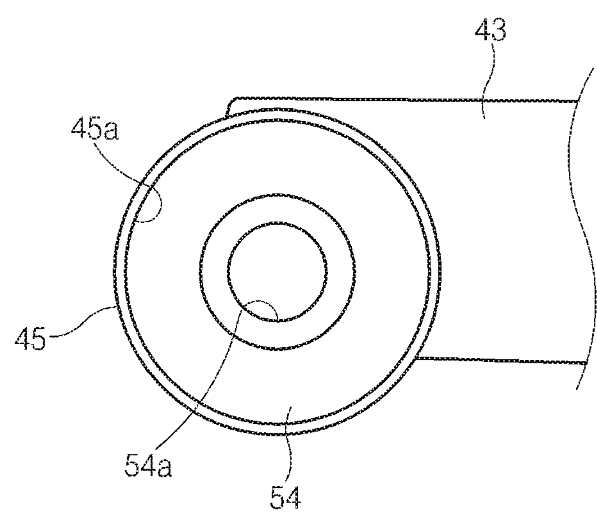
FIG. 11 illustrates a front view of a second hinge hub of the lateral damping rod in FIG. 9.
Figure 12:
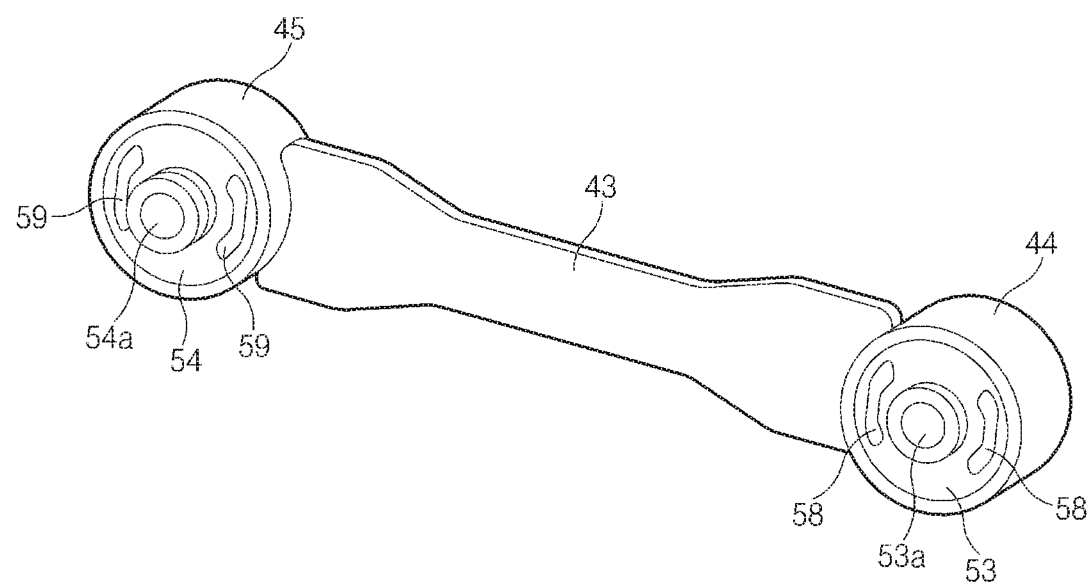
FIG. 12 illustrates a perspective view of a lateral damping rod of a rear mount in a cab mounting apparatus for a commercial vehicle, according to another exemplary embodiment of the present disclosure.
Figure 13:
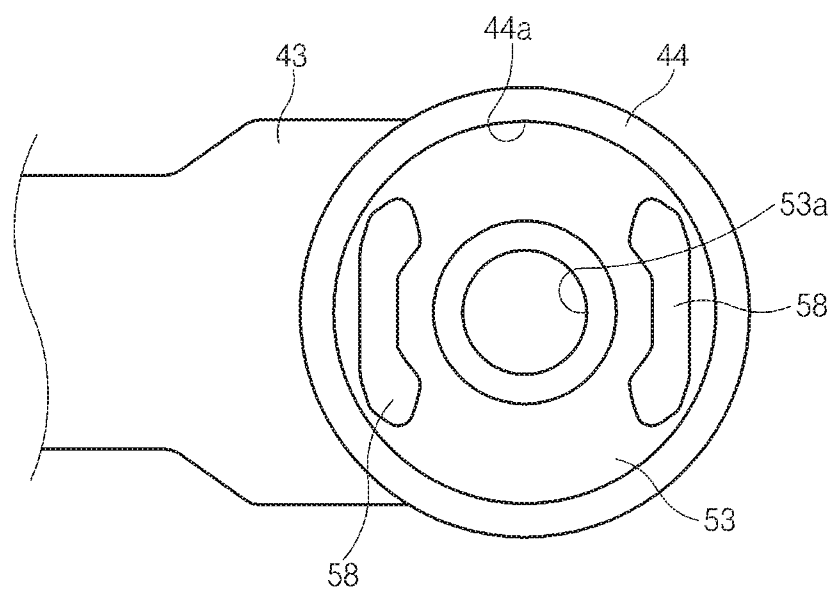
FIG. 13 illustrates a front view of a first hinge hub of the lateral damping rod in FIG. 12.

According to an exemplary embodiment, the second bush 54 may have a solid structure in which no void is formed, as illustrated in FIG. 11.

Figure 14:
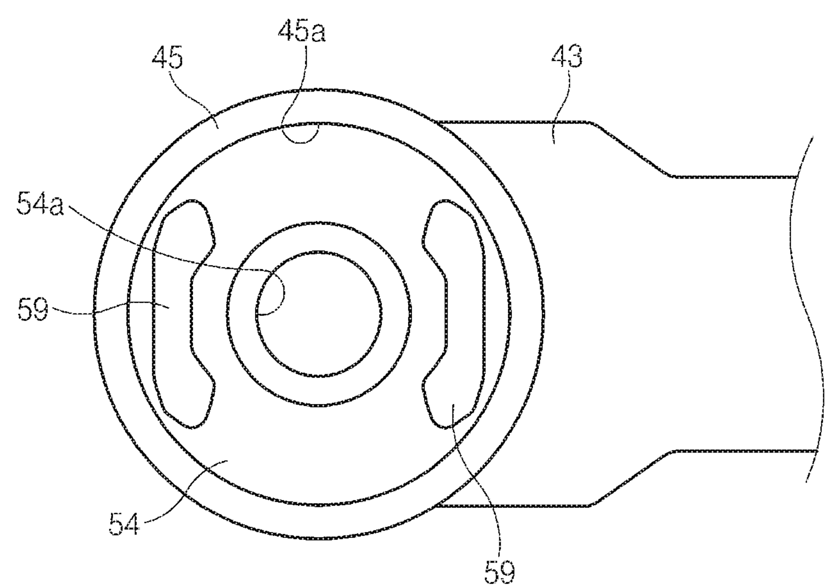
FIG. 14 illustrates a front view of a second hinge hub of the lateral damping rod in FIG. 12.

According to another exemplary embodiment, the second bush 54 may have a pair of opposing voids 59 formed therein, as illustrated in FIG. 14. The pair of voids 59 may be spaced apart from each other in a direction in which a load is applied to the second bush 54. For example, since each lateral damping rod 43 is extended in the lateral direction of the cab 5, the load may be applied to the lateral damping rod 43 in the lateral direction of the cab 5 such that the pair of voids 59 may be spaced apart from each other in the lateral direction of the cab 5.

Each void 59 may have a circular arc shape corresponding to the circular cross-section of the second bush 54. As the pair of voids 59 are spaced apart from each other in the second bush 54 in the lateral direction of the cab 5, they may lessen or absorb shock to the lateral damping rod 43 in the lateral direction of the cab 5, and thus the lateral movement, lateral vibration, and the like of the cab 5 may be effectively prevented.

In addition, the rear mount 40 may be provided with the bar-like lateral damping rod 43 and the first and second bushes 53 and 54 having superior shock-absorbing capability and applied to both ends of the lateral damping rod 43, thereby effectively preventing the lateral movement, lateral vibration, and the like of the cab 5, and providing a simple structure to improve durability and reduce the manufacturing costs thereof.

Figure 15:
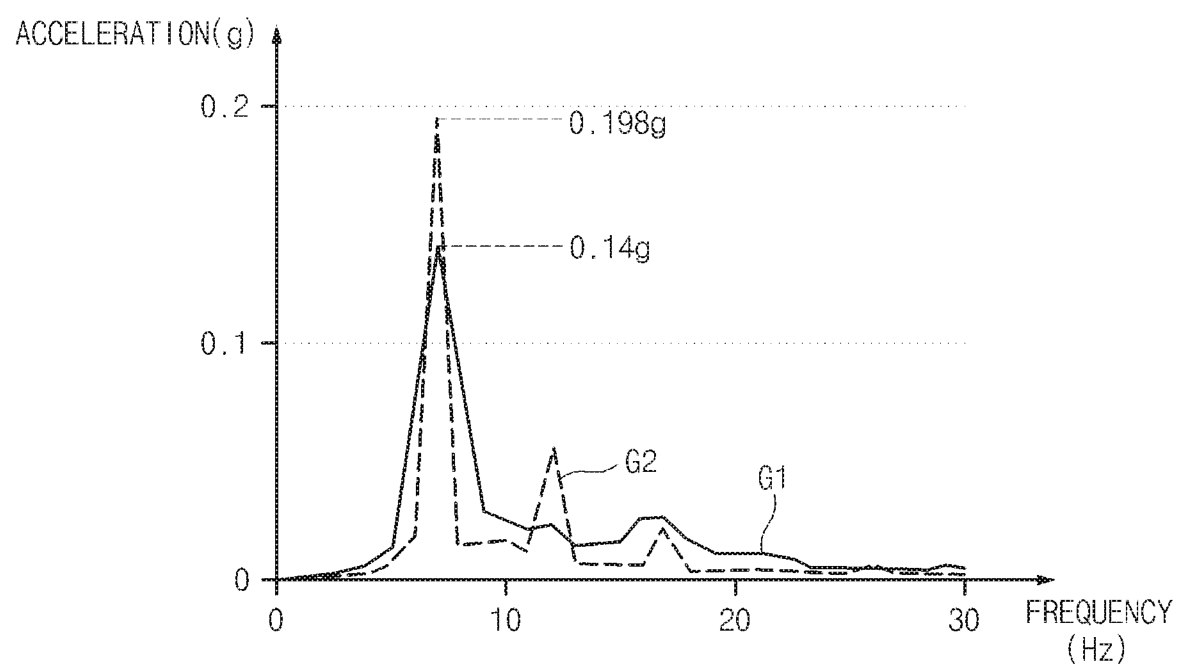
FIG. 15 illustrates a graph of a relationship between frequency and longitudinal acceleration of a cab.

FIG. 15 illustrates a graph of a relationship between frequency and longitudinal acceleration (front-to-rear direction) of a cab.

FIG. 15 illustrates the relationship between frequency and longitudinal acceleration measured in the interior of the cab when a commercial vehicle drives at a constant speed (for example, 70 km/s). Line G1 represents the longitudinal acceleration of a cab according to an exemplary embodiment of the present disclosure, and line G2 represents the longitudinal acceleration of a conventional cab according to the related art.

As illustrated in FIG. 15, it can be seen that the longitudinal acceleration G1 of the cab according to the exemplary embodiment of the present disclosure was relatively lower than the longitudinal acceleration G2 of the conventional cab according to the related art. In particular, the longitudinal acceleration of the cab at a frequency of 5 Hz may be a peak point. For example, the longitudinal acceleration of the cab according to the exemplary embodiment of the present disclosure was 0.14 g at 5 Hz, and the longitudinal acceleration of the conventional cab according to the related art was 0.198 g at 5 Hz. In other words, it can be seen that the longitudinal acceleration of the cab according to the exemplary embodiment of the present disclosure was lowered by approximately 30%, compared to that of the conventional cab according to the related art.

Figure 16:
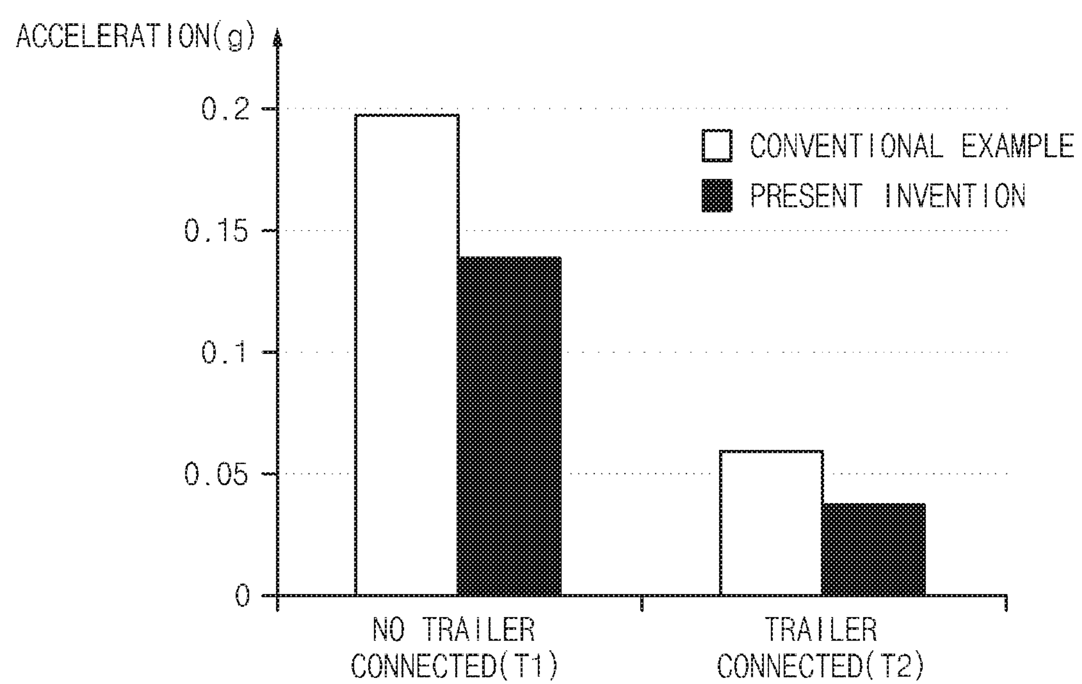
FIG. 16 illustrates a graph of longitudinal acceleration of a cab at a specific frequency.

FIG. 16 illustrates a graph of longitudinal acceleration of a cab at a specific frequency (for example, 5 Hz) when a commercial vehicle drives at a constant speed (for example, 70 km/s).

T1 represents the longitudinal acceleration measured in the interior of the cab when a commercial vehicle to which no trailer is connected drives at a constant speed (for example, 70 km/s). It can be seen that the longitudinal acceleration of a cab according to an exemplary embodiment of the present disclosure was lowered by approximately 30%, compared to that of a conventional cab according to the related art.

T2 represents the longitudinal acceleration measured in the interior of the cab when a commercial vehicle to which a trailer is connected drives at a constant speed (for example, 70 km/s). It can be seen that the longitudinal acceleration of a cab according to an exemplary embodiment of the present disclosure was lowered by approximately 30%, compared to that of a conventional cab according to the related art.

Meanwhile, comparing T1 with T2, it can be seen that the longitudinal acceleration T2 of the cab in the commercial vehicle to which the trailer is connected was relatively lower than the longitudinal acceleration T1 of the cab in the commercial vehicle to which no trailer is connected.

As can be seen in FIGS. 15 and 16, the longitudinal acceleration of the cab according to the exemplary embodiment of the present disclosure was improved by approximately 30%, compared to that of the conventional cab according to the related art, and thus ride comfort in the longitudinal direction of the cab according to the exemplary embodiment of the present disclosure can be greatly improved.

Figure 17:
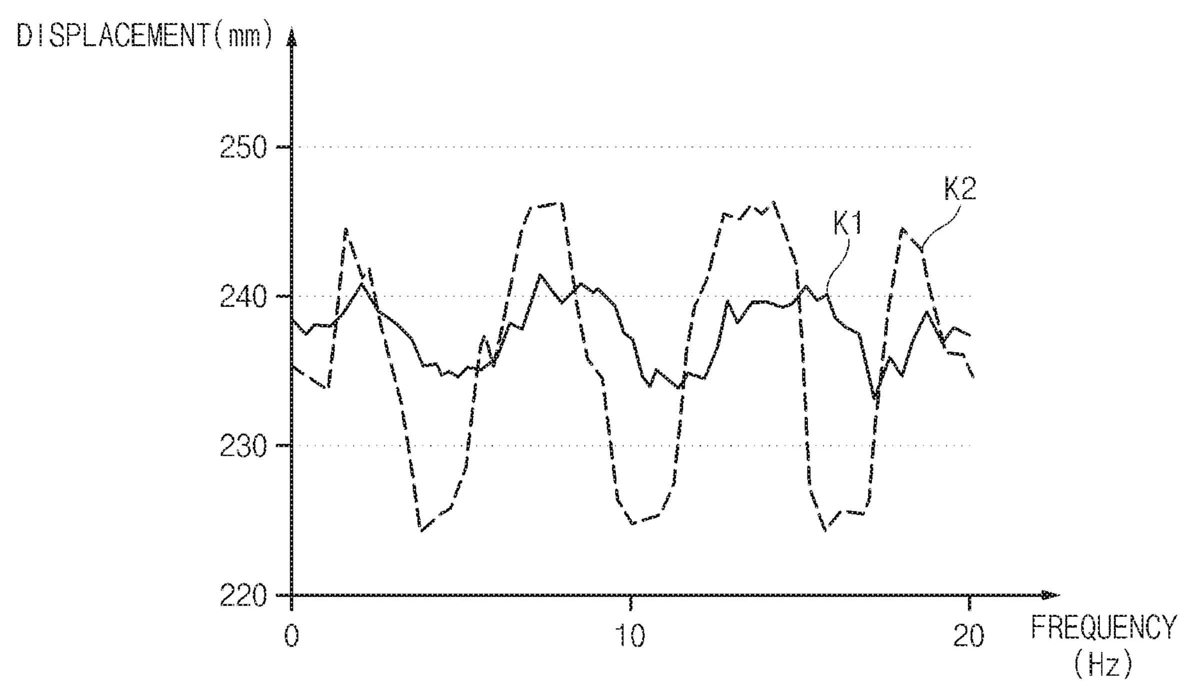
FIG. 17 illustrates a graph of a relationship between frequency and lateral displacement of a cab.

FIG. 17 illustrates a graph of a relationship between frequency and lateral displacement of a cab. It illustrates the relationship between frequency and lateral displacement measured in the outside of the cab in a slalom test while a commercial vehicle is driving at a constant speed.

Line K1 represents the lateral displacement of a cab according to an exemplary embodiment of the present disclosure, and line K2 represents the lateral displacement of a conventional cab according to the related art.

Referring to FIG. 17, it can be seen that the lateral displacement K1 of the cab according to the exemplary embodiment of the present disclosure was lowered by approximately 30%, compared to the lateral displacement K2 of the conventional cab according to the related art.

Figure 18:
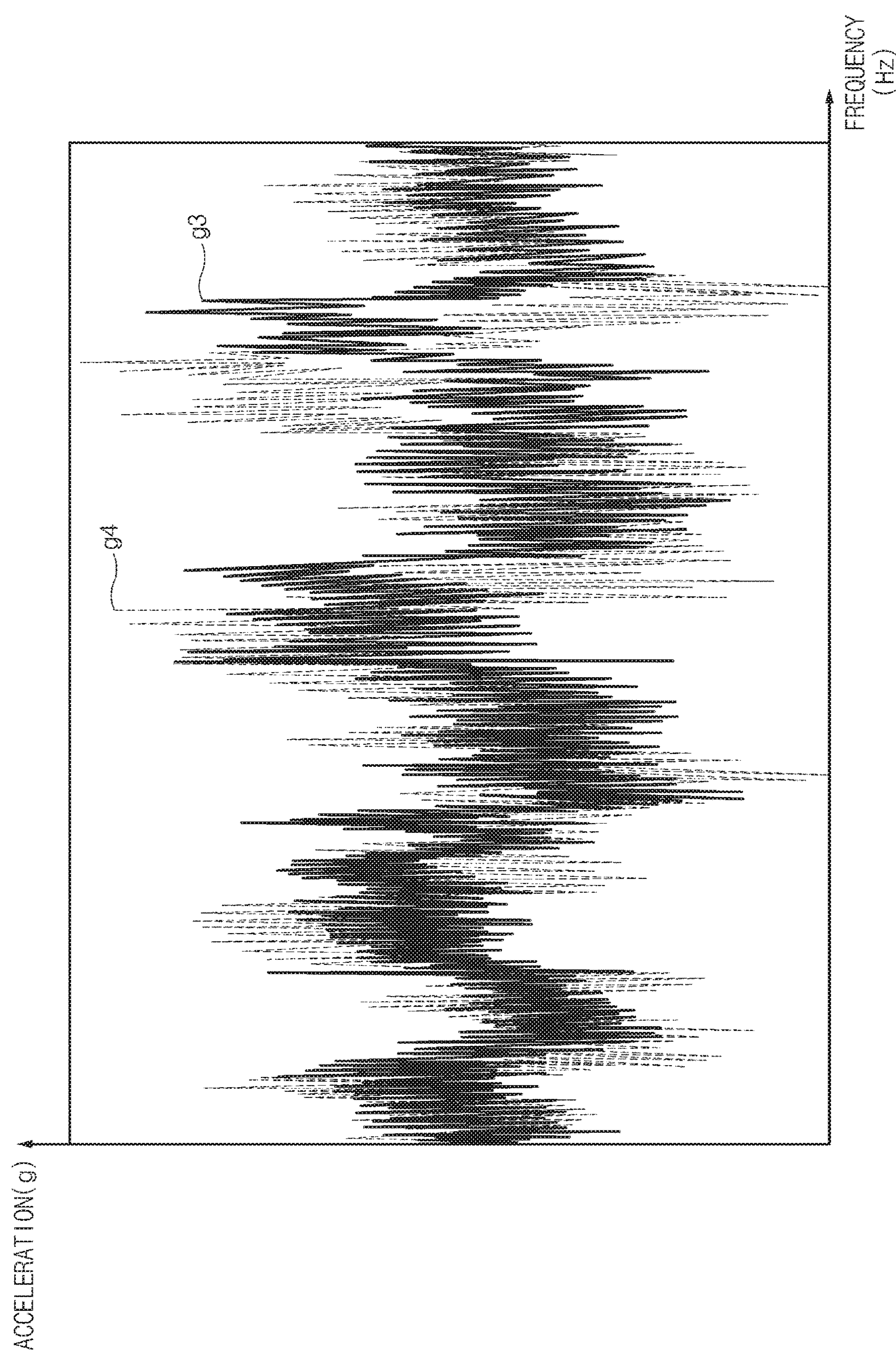
FIG. 18 illustrates a graph of a relationship between frequency and lateral acceleration of a cab in a slalom test.

FIG. 18 illustrates a graph of a relationship between frequency and lateral acceleration of a cab in a slalom test. It illustrates the relationship between frequency and lateral acceleration measured in the outside of the cab in the slalom test while a commercial vehicle is driving at a constant speed. Line G3 represents a relationship between frequency and lateral acceleration of a cab according to an exemplary embodiment of the present disclosure, and line G4 represents a relationship between frequency and lateral acceleration of a conventional cab according to the related art.

Referring to FIG. 18, it can be seen that the lateral acceleration G3 of the cab according to the exemplary embodiment of the present disclosure was lowered by approximately 30%, compared to the lateral acceleration G4 of the conventional cab according to the related art.

Figure 19:
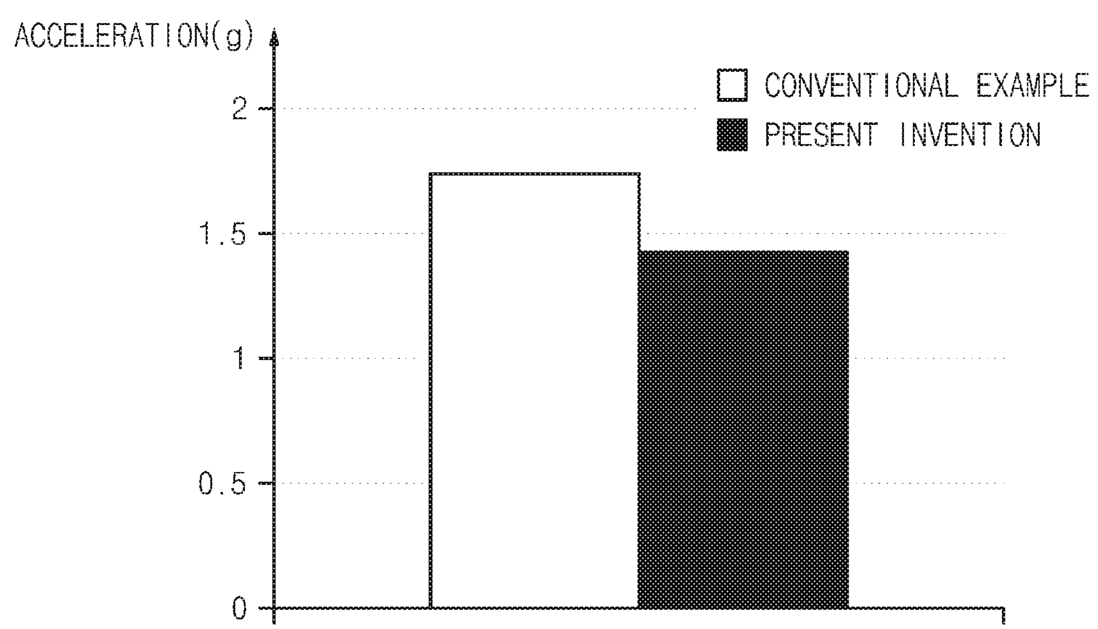
FIG. 19 illustrates a graph of lateral acceleration of a cab at a specific frequency in a slalom test.

FIG. 19 illustrates a graph of lateral acceleration of a cab at a specific frequency (for example, 5 Hz) in a slalom test when a commercial vehicle drives at a constant speed (for example, 70 km/s). It can be seen that the lateral acceleration of a cab according to an exemplary embodiment of the present disclosure was lowered by approximately 30%, compared to that of a conventional cab according to the related art.

As can be seen in FIGS. 17 and 18, it can be seen that the lateral displacement and lateral acceleration of the cab according to the exemplary embodiment of the present disclosure was improved by approximately 30%, compared to those of the conventional cab according to the related art, and thus ride comfort in the lateral direction of the cab according to the exemplary embodiment of the present disclosure can be greatly improved.

Figure 20:
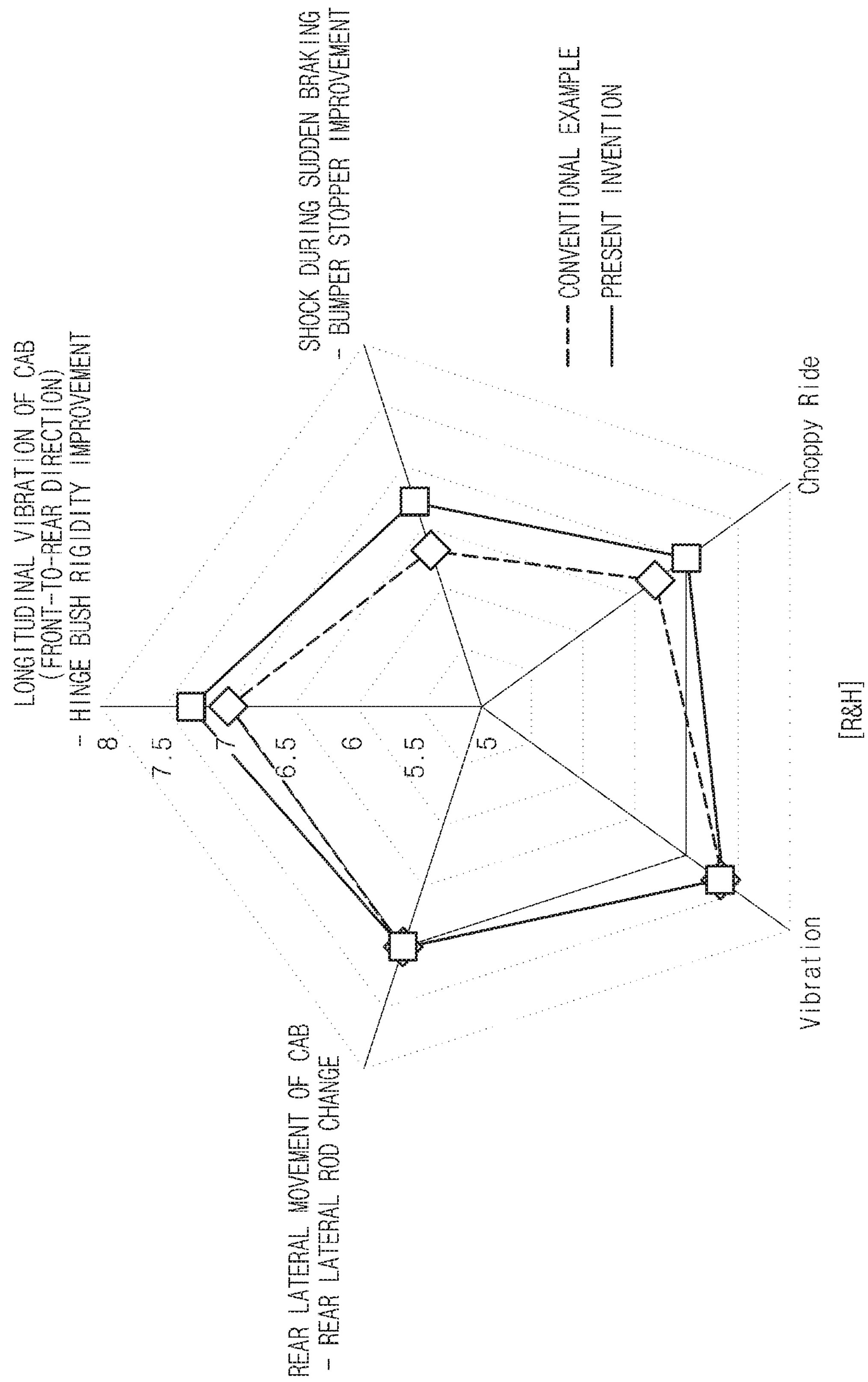
FIG. 20 illustrates a spider chart of results of a driver's subjective evaluation with respect to ride comfort and handling.

FIG. 20 illustrates a spider chart of results of a driver's subjective evaluation with respect to ride comfort and handling.

As illustrated in FIG. 20, it can be seen that the characteristics of a cab related to longitudinal vibration, shock transmitted to the cab during a sudden breaking, choppy ride, and the like, according to an exemplary embodiment of the present disclosure, were significantly improved compared to those of a conventional cab according to the related art. In addition, it can be seen that the characteristics of the cab related to lateral movement, vibration, and the like, according to the exemplary embodiment of the present disclosure, were slightly improved compared to those of the conventional cab according to the related art.

Figure 21:
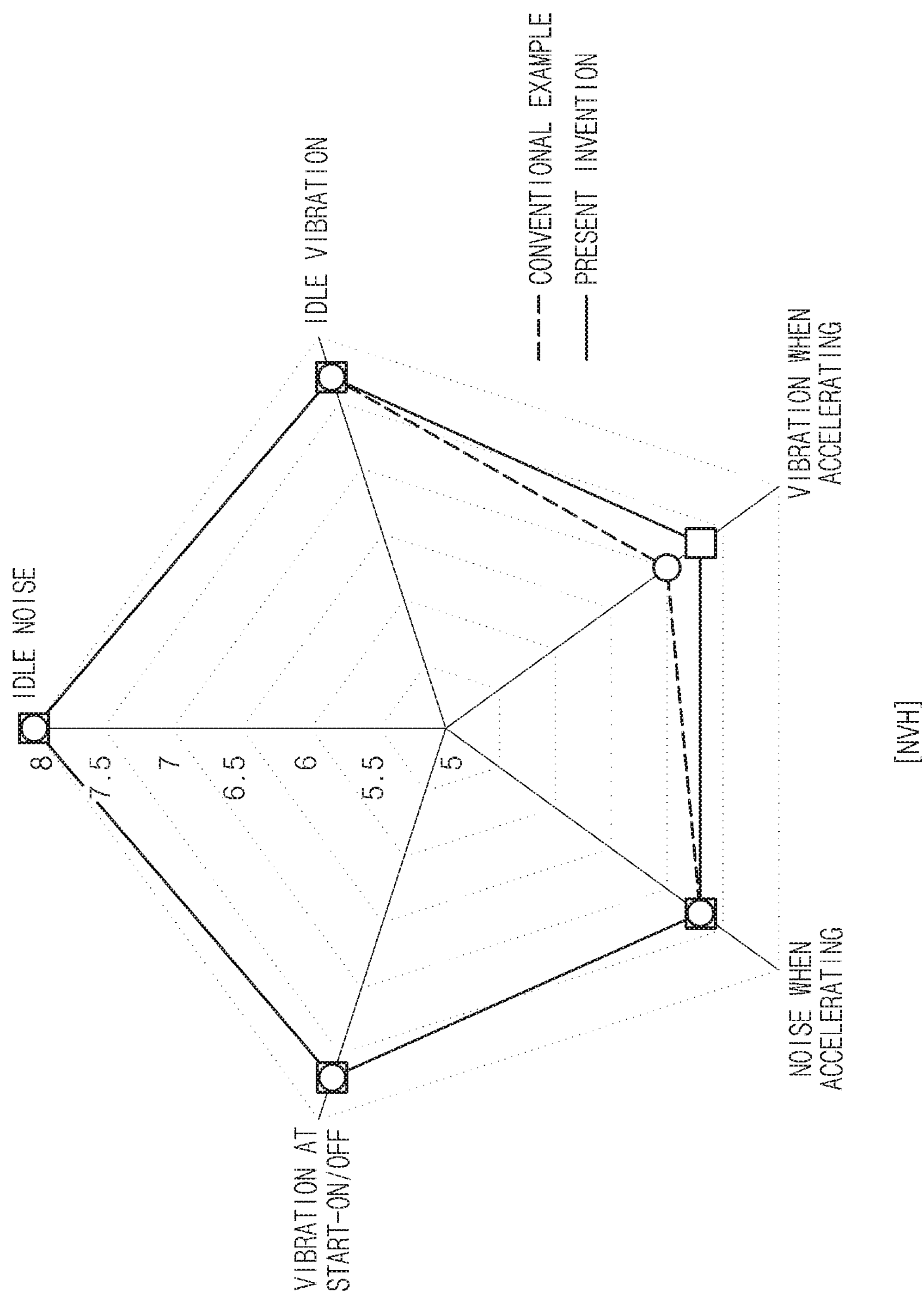
FIG. 21 illustrates a spider chart of results of a driver's subjective evaluation with respect to noise of a commercial vehicle.

FIG. 21 illustrates a spider chart of results of a driver's subjective evaluation with respect to noise NVH of a commercial vehicle.

As illustrated in FIG. 21, it can be seen that the characteristic of a cab related to vibration when accelerating, according to an exemplary embodiment of the present disclosure, was significantly improved compared to that of a conventional cab according to the related art. In addition, it can be seen that the characteristics of the cab related to idle noise, vibration at start-on/off, idle vibration, noise when accelerating, and the like, according to the exemplary embodiment of the present disclosure, were slightly improved compared to those of the conventional cab according to the related art.

According to exemplary embodiments of the present disclosure, the front mount 20 may be configured such that the bush 32 and the pair of stopper members 33 to be mounted in the connecting arm 23 may be integrated into a single unitary body, and the rear mount 40 may be configured to include the lateral damping rod 43 and the bushes 53 and 54 having superior shock-absorbing capability and applied to both ends of the lateral damping rod 43, thereby reducing manufacturing costs, weight, and the like.

As set forth above, according to exemplary embodiments of the present disclosure, as the bush and the pair of stopper members to be mounted in the connecting arm of the front mount are integrated as a single unitary body, the longitudinal movement and longitudinal vibration of the cab may effectively be prevented, and the assembly of the bush and the stopper members in the hinge hub of the connecting arm may be significantly facilitated. As the longitudinal stiffness of the bush is reinforced by the pair of stopper members, durability of the bush may be improved. The bush and the pair of stopper members may be manufactured at one time by insert molding, thereby significantly reducing the manufacturing costs thereof.

In addition, according to exemplary embodiments of the present disclosure, the rear mount may be provided with the bar-like lateral damping rod and the first and second bushes having superior shock-absorbing capability and applied to both ends of the lateral damping rod, thereby effectively preventing the lateral movement, lateral vibration, and the like of the cab, and providing a simple structure to improve durability and reduce the manufacturing costs thereof.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A cab mounting apparatus for a vehicle, the cab mounting apparatus comprising:

a front mount connecting between a front side of a cab and a chassis; and a rear mount connecting between a rear side of the cab and the chassis;

wherein the front mount includes a stabilizer link disposed on a front side of the vehicle, a pair of front brackets individually fixed to the front side of the cab, and a pair of connecting arms individually connecting between respective ends of the stabilizer link and the respective front brackets;

wherein each connecting arm is pivotally connected to each front bracket by a hinge member and a bush;

wherein the bush has a pair of stopper members disposed on both ends thereof;

wherein the bush and the pair of stopper members are integrated into a single unitary body;

wherein each connecting arm has a first hinge hub pivotally connected to each front bracket and a second hinge hub pivotally connected to each end of the stabilizer link;

wherein the first hinge hub has a first through bore in which the hinge member and the bush disposed around the hinge member are received; and wherein the second hinge hub has a second through bore in which each end of the stabilizer link is received.

2. The cab mounting apparatus according to claim 1, wherein the pair of stopper members are molded with the bush by insert molding such that the pair of stopper members are integrated into both ends of the bush to form the single unitary body.

3. The cab mounting apparatus according to claim 1, wherein a flange having an annular shape is provided on one end of the bush, and wherein an outer diameter of the flange is greater than an outer diameter of the bush.

4. The cab mounting apparatus according to claim 1, wherein the bush is press-fit into the first through bore.

5. The cab mounting apparatus according to claim 1, wherein the bush includes a pair of opposing voids that are spaced apart from each other in a direction in which a load is applied to the bush.

6. The cab mounting apparatus according to claim 1, wherein the bush is made of a rubber material and the stopper members are made of a metal material.

7. The cab mounting apparatus according to claim 1, wherein the rear mount includes a rear bridge connecting between a pair of side members, a pair of rear dampers individually disposed between respective ends of the rear bridge and a bottom of the rear side of the cab, and a pair of lateral damping rods individually mounted between respective ends of the rear bridge and the respective rear dampers, and each lateral damping rod is extended in a lateral direction of the cab.

8. The cab mounting apparatus according to claim 7, wherein the lateral damping rod has a shape of a bar having a thickness less than a width thereof.

9. The cab mounting apparatus according to claim 7, wherein an upper bracket is coupled to a top end of each rear damper;

wherein the rear bridge has a pair of fixing brackets symmetrically disposed; and wherein the pair of lateral damping rods are individually connected between the upper brackets of the rear dampers and the fixing brackets of the rear bridge, respectively.

10. The cab mounting apparatus according to claim 9, wherein each lateral damping rod has a first hinge hub pivotally connected to each upper bracket by a first hinge member and a first bush, and a second hinge hub pivotally connected to each fixing bracket of the rear bridge by a second hinge member and a second bush.

11. The cab mounting apparatus according to claim 10, wherein the first hinge hub has a first through bore in which the first hinge member and the first bush disposed around the first hinge member are received wherein the first bush has a bore through which the first hinge member passes; and wherein an inner diameter of the bore is greater than an outer diameter of the first hinge member.

12. A cab mounting apparatus for a vehicle, the cab mounting apparatus comprising:

a front mount connecting between a front side of a cab and a chassis; and a rear mount connecting between a rear side of the cab and the chassis;

wherein the front mount includes a stabilizer link disposed on a front side of the vehicle, a pair of front brackets individually fixed to the front side of the cab, and a pair of connecting arms individually connecting between respective ends of the stabilizer link and the respective front brackets;

wherein each connecting arm is pivotally connected to each front bracket by a hinge member and a bush;

wherein the bush has a pair of stopper members disposed on both ends thereof;

wherein the bush and the pair of stopper members are integrated into a single unitary body;

wherein the rear mount includes a rear bridge connecting between a pair of side members, a pair of rear dampers individually disposed between respective ends of the rear bridge and a bottom of the rear side of the cab, and a pair of lateral damping rods individually mounted between respective ends of the rear bridge and the respective rear dampers, and each lateral damping rod is extended in a lateral direction of the cab;

wherein an upper bracket is coupled to a top end of each rear damper;

wherein the rear bridge has a pair of fixing brackets symmetrically disposed; and wherein the pair of lateral damping rods are individually connected between the upper brackets of the rear dampers and the fixing brackets of the rear bridge, respectively.

13. The cab mounting apparatus according to claim 12, wherein each lateral damping rod has a first hinge hub pivotally connected to each upper bracket by a first hinge member and a first bush, and a second hinge hub pivotally connected to each fixing bracket of the rear bridge by a second hinge member and a second bush.

14. The cab mounting apparatus according to claim 13, wherein the first hinge hub has a first through bore in which the first hinge member and the first bush disposed around the first hinge member are received;

wherein the first bush has a bore through which the first hinge member passes; and wherein an inner diameter of the bore is greater than an outer diameter of the first hinge member.

15. The cab mounting apparatus according to claim 13, wherein the second hinge hub has a second through bore in which the second hinge member and the second bush disposed around the second hinge member are received wherein the second bush has a bore through which the second hinge member passes; and wherein an inner diameter of the bore is greater than an outer diameter of the second hinge member.

16. The cab mounting apparatus according to claim 13, wherein the first bush or the second bush includes a pair of opposing voids.

17. The cab mounting apparatus according to claim 16, wherein the pair of voids are spaced apart from each other in a direction in which a load is applied to the first bush or the second bush that includes a pair of opposing voids.

18. A vehicle comprising:

a cab;

a chassis;

a front mount connecting between a front side of the cab and the chassis; and a rear mount connecting between a rear side of the cab and the chassis;

wherein the front mount includes a stabilizer link disposed on a front side of the vehicle, a pair of front brackets individually fixed to the front side of the cab, and a pair of connecting arms individually connecting between respective ends of the stabilizer link and the respective front brackets;

wherein each connecting arm is pivotally connected to each front bracket by a hinge member and a bush;

wherein the bush has a pair of stopper members disposed on both ends thereof;

wherein the bush and the pair of stopper members are integrated into a single unitary body;

wherein each connecting arm has a first hinge hub pivotally connected to each front bracket and a second hinge hub pivotally connected to each end of the stabilizer link;

wherein the first hinge hub has a first through bore in which the hinge member and the bush disposed around the hinge member are received; and wherein the second hinge hub has a second through bore in which each end of the stabilizer link is received.

19. The vehicle according to claim 18, wherein the rear mount includes a rear bridge connecting between a pair of side members, a pair of rear dampers individually disposed between respective ends of the rear bridge and a bottom of the rear side of the cab, and a pair of lateral damping rods individually mounted between respective ends of the rear bridge and the respective rear dampers.

20. The vehicle according to claim 19, wherein each lateral damping rod is extended in a lateral direction of the cab.

* * * * *